(12) United States Patent
Hwang

(10) Patent No.: US 6,212,507 B1
(45) Date of Patent: Apr. 3, 2001

(54) FUZZY INFERENCE CIRCUIT USING CHARGE COUPLED DEVICE

(75) Inventor: Sung Hoon Hwang, Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/000,637

(22) Filed: Dec. 30, 1997

(30) Foreign Application Priority Data

Dec. 30, 1996 (KR) .................................................. 96-76884
Dec. 24, 1997 (KR) .................................................. 97-72901

(51) Int. Cl.[7] ...................................................... G06F 15/18
(52) U.S. Cl. ...................... 706/8; 706/1; 706/5; 706/900; 706/903
(58) Field of Search ................................ 395/3; 706/8, 5, 706/1, 900, 903; 708/801

(56) References Cited

U.S. PATENT DOCUMENTS

| | | | |
|---|---|---|---|
| 5,054,040 | 10/1991 | Yariv et al. | 377/60 |
| 5,136,685 * | 8/1992 | Nagazumi | 708/801 |
| 5,228,111 * | 7/1993 | Nagazumi | 708/801 |
| 5,247,472 * | 9/1993 | Nagazumi | 708/801 |

OTHER PUBLICATIONS

"Expert System on a Chip: An Engine for Real–Time Approximate Reasoning," Togai et al., IEEE, 1986, pps. 55–62.

"A VLSI Fuzzy Logic Controller with Reconfigurable, Cascadable Architecture," Watanabe et al., IEEE Journal of Solid–State Circuits, vol. 25, No. 2, Apr. 1990, pps. 376–382.

"Neural Networks and Fuzzy Logic, Tools of Promise for Controls," McCusker, Control Engineering, May 1990, pps. 84–85.

* cited by examiner

Primary Examiner—George B. Davis

(57) ABSTRACT

The fuzzy inference circuit includes a sensor sensing a state of a control object, and a charge coupled device storing fuzzy rule function values for at least one fuzzy rule function. The charge coupled device further performs a fuzzy inference on output of the sensor using the fuzzy rule function values to generate a control signal for controlling the control object.

20 Claims, 9 Drawing Sheets

FUZZY INFERENCE CIRCUIT USING CHARGE COUPLED DEVICE

BACKGROUND OF THE INVENTION

1. Field of the Invention

The present invention relates to a fuzzy inference circuit, and more particularly, to a fuzzy inference circuit using a charge coupled device.

2. Discussion of the Related Art

A conventional fuzzy inference circuit will be described with reference to the accompanying drawings.

FIG. 1 is a configuration block diagram of a conventional fuzzy inference circuit. FIG. 2 is a configuration block diagram of a fuzzy rule memory using conventional digital logic.

Referring to FIG. 1, a conventional fuzzy inference circuit includes a control object 1, a sensor 2, an analog to digital (A/D) converter 3, a clock generator 4, a fuzzy rule memory 5, a fuzzy inference engine 6, and a digital to analog (D/A) converter 7.

The sensor 2 senses a state of the control object 1, and transfers the sensed value of the control object 1 to the A/D converter 3. The A/D converter 3 converts an analog signal of the sensor 2 to a digital signal.

The fuzzy rule memory 5 stores fuzzy rule function values through digital logic. The fuzzy inference engine 6 receives a clock signal generated from the clock generator 4 in order to perform a fuzzy inference using the fuzzy rule function values and the digitized sensed value in a well-known manner. The D/A converter 7 converts a digital signal from the fuzzy inference engine 6 to an analog signal to control the control object 1.

Referring to FIG. 2, the fuzzy rule memory 5 includes a first memory 8, a second memory 9, a comparator 10, a selector 11, and a third memory 12.

The first and second memories 8 and 9 store fuzzy rule function values. The comparator 10 compares the fuzzy rule function values from the first and second memories 8 and 9 with each other to output their comparative value to the selector 11. The selector 11 selects either the fuzzy rule function value from the first memory 8 or the fuzzy rule function value from the second memory 9 in response to a selective signal S input from the comparator 10, and transfers the selected value to the third memory 12. The third memory 12 transfers the fuzzy rule function value transferred from the selector 11 to the fuzzy inference engine 6.

Referring to FIG. 1, fuzzy inference engine 6 receives the clock signal from the clock generator 4, the digital signal from the A/D converter 3 and the fuzzy rule function values from the fuzzy rule memory 5, and performs a fuzzy inference on the sensed value using the fuzzy rule function values according to an operational timing established by the clock signal. The fuzzy inferred value from the fuzzy inference engine 6 is converted to an analog value through the D/A converter 7, and supplied as a control value to the control object 1.

The conventional fuzzy inference circuit has a problem in that additional memories such as the first, second and third memories are required to store a digital value when the fuzzy inference is performed using a digital circuit. In addition, since an analog signal is input and output, the A/D converter and the D/A converter are additionally required. For this reason, the conventional fuzzy inference circuit has disadvantages such as high cost and slow process speed.

SUMMARY OF THE INVENTION

Accordingly, the present invention is directed to a fuzzy inference circuit using a charge coupled device that substantially obviates one or more of the problems due to limitations and disadvantages of the related art.

An object of the present invention is to provide a fuzzy inference circuit using a charge coupled device in which an area of a memory is reduced and a fast processing speed is achieved.

These and other objects are achieved by providing a fuzzy inference circuit, comprising: a sensor sensing a state of a control object; and a charge coupled device storing fuzzy rule function values for at least one fuzzy rule function, and performing a fuzzy inference on output of said sensor using said fuzzy rule function values to generate a control signal for controlling said control object.

These and other objects are further achieved by providing a fuzzy inference circuit, comprising: a sensor sensing a state of a control object; and a fuzzy rule memory storing fuzzy rule function values for at least one fuzzy rule function using a charge coupled device; a fuzzy inference engine using said charge coupled device to perform a fuzzy inference on output of said sensor based on said fuzzy rule function values; and a defuzzy inference engine generating a control signal for controlling said control object based on output of said fuzzy inference engine.

These and other objects are still further achieved by providing a fuzzy inference method, comprising: sensing a state of a control object using a sensor; storing fuzzy rule function values for at least one fuzzy rule function using a charge coupled device; performing, using said charge coupled device, a fuzzy inference on output of said sensor based on said fuzzy rule function values; and controlling said control object based on output of said performing step.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3b illustrates the wave forms of signals generated by the fuzzy inference circuit of FIG. 3a;

DETAILED DESCRIPTION OF THE PREFERRED EMBODIMENTS

Figure 1:
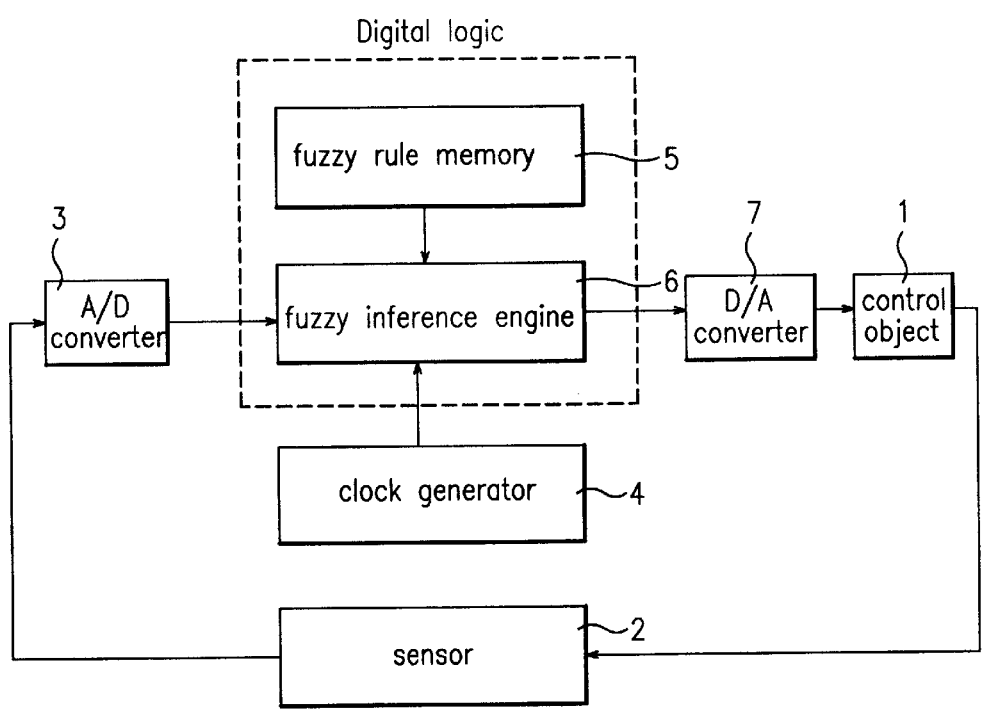
FIG. 1 is a configuration block diagram of a conventional fuzzy inference circuit.
Figure 2:
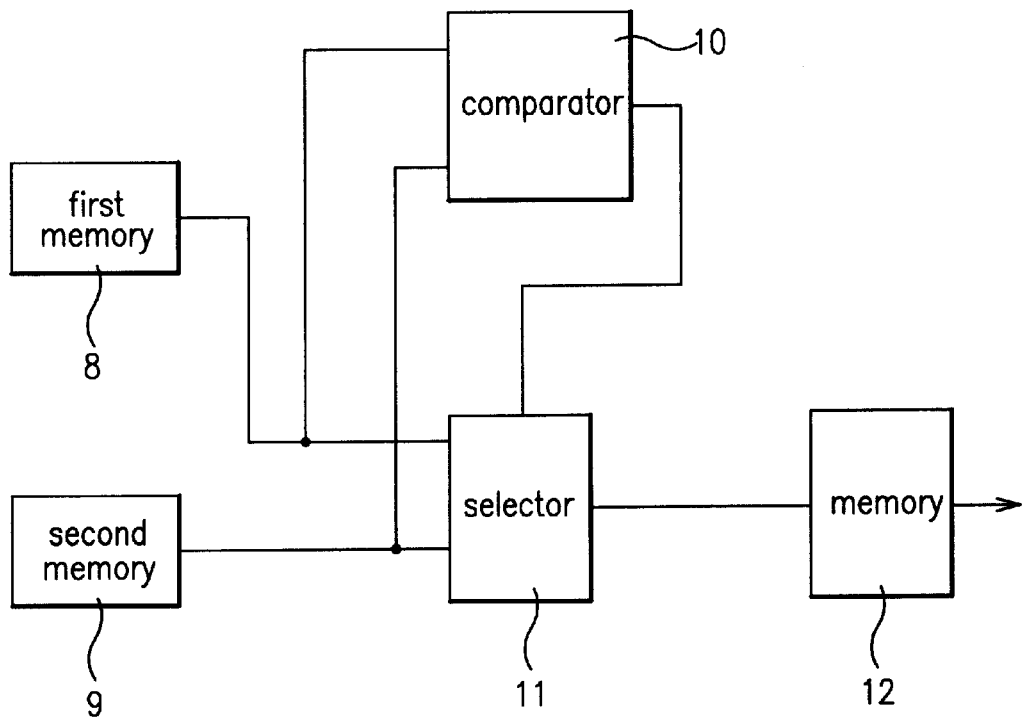
FIG. 2 is a configuration block diagram of a fuzzy rule memory using conventional digital logic.
Figure 3A:
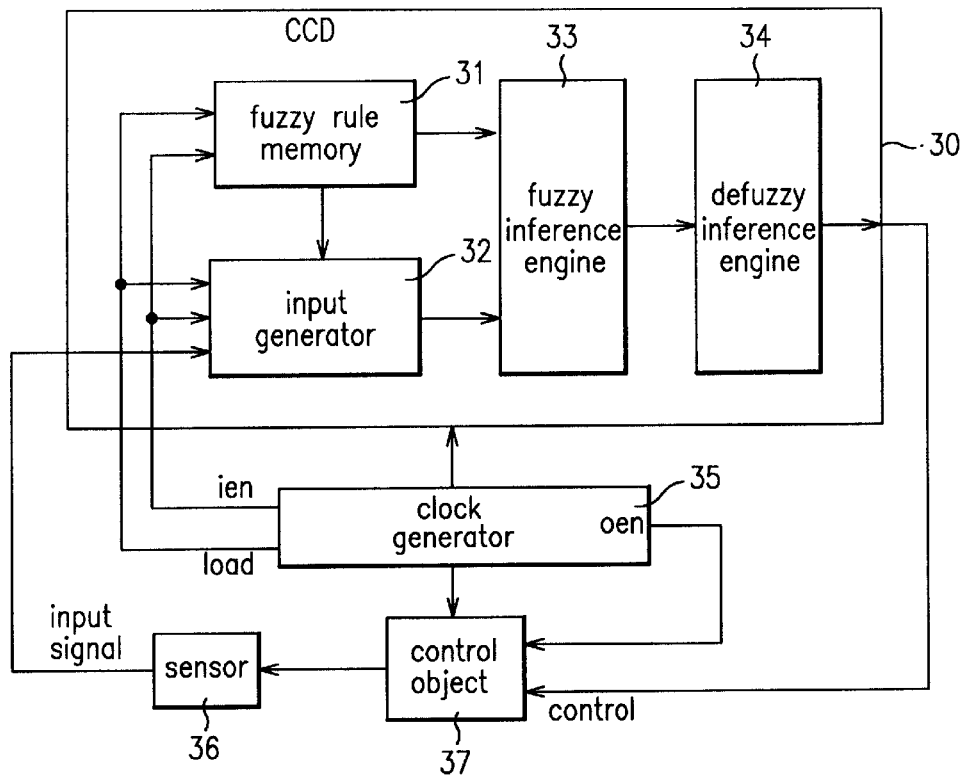
FIG. 3a is a configuration block diagram of a fuzzy inference circuit according to the present invention.

FIG. 3$a$ is a configuration block diagram of a fuzzy inference circuit according to the present invention. The fuzzy inference circuit according to the present invention uses a charge coupled device (CCD) 30 to control a control object 37 based on the output of a sensor 36 and a clock generator 35. The sensor 36 senses the current state of the control object 37, and the CCD 30 generates a control signal for controlling the control object 37 based on the input signal from the sensor 36.

The clock generator 35 supplies operation timing signals to the control object 37 and the CCD 30. Furthermore, the clock generator 35 outputs a first enable signal ien to the CCD 30 to enable operation thereof, and outputs a second enable signal oen to the control object 37 to enable receipt of the control signal. The clock generator 35 also supplies a load signal to the CCD 30 to control the charge generators (as discussed below) included therein.

As shown in FIG. 3$a$, the CCD 30 includes a fuzzy rule memory 31, an input generator 32, a fuzzy inference engine 33, and a defuzzy inference engine 34. The fuzzy rule memory 31 stores fuzzy rule function values for at least one fuzzy set or fuzzy rule function. For the purposes of describing the present invention, the fuzzy rule memory 31 will be described as storing a first fuzzy rule function F1 and second fuzzy rule function F2. The fuzzy rule memory 31 receives the first enable signal ien and the load signal from the clock generator 35, and outputs fuzzy rule function values based thereon.

The input generator 32 receives the input signal from the sensor 36, the first enable signal ien from the clock generator 35, and the load signal from the clock generator 35. Based on these inputs, the input generator 32 generates input values. The fuzzy inference engine 33 performs a fuzzy inference on the input values from the input generator 32 in accordance with the fuzzy rule function values received from the fuzzy rule memory 31. The defuzzy inference engine 34 generates a final fuzzy inference value, the control signal, from the fuzzy inference value output by the fuzzy inference engine 33 to control the control object 37.

Figure 4A:
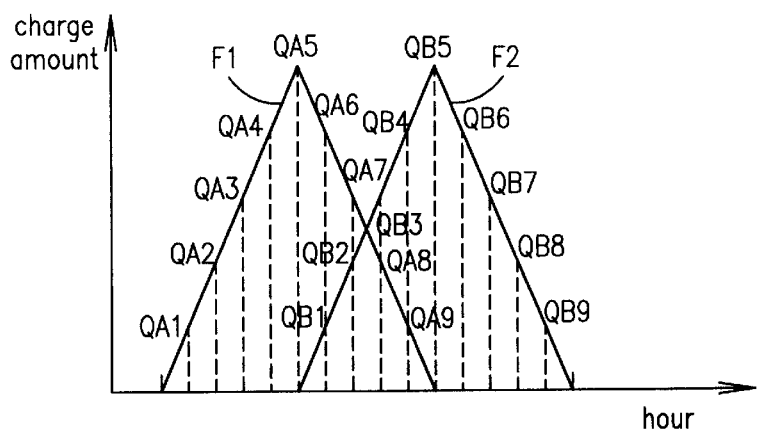
FIGS. 4a, 4b and 4c are graphs illustrating fuzzy rule functions according to an embodiment of the present invention.
Figure 4B:
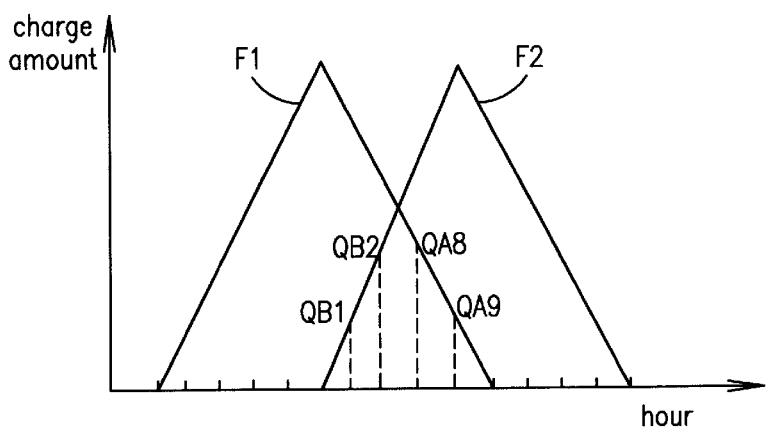
Figure 4C:
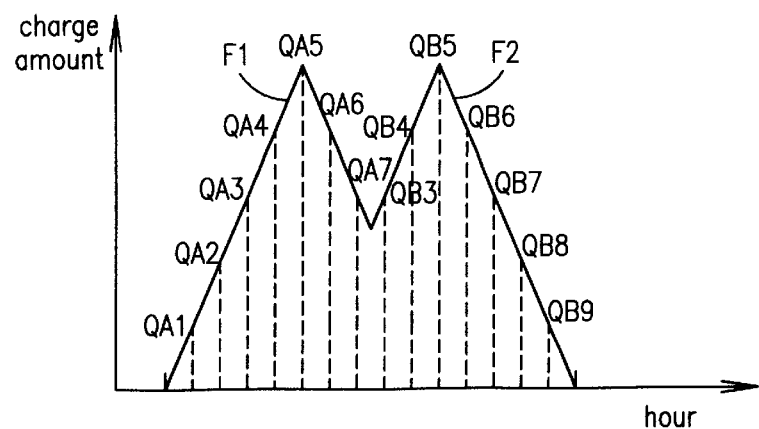

FIGS. 4$a$–4$c$ are graphs illustrating the first fuzzy rule function F1 and the second fuzzy rule function F2 stored in the fuzzy rule memory 31. Specifically, FIG. 4$a$ shows charge values QA1–QA9 and QB1–QB9 for the first and second fuzzy rule functions F1 and F2, respectively. FIG. 4$b$ shows minimum values when comparing charge values QA1–QA9 with QB1–QB9 per hour. FIG. 4$c$ shows maximum values when comparing charge values QA1–QA9 with QB1–QB9 per hour.

FUZZY RULE MEMORY 31

Figure 5:
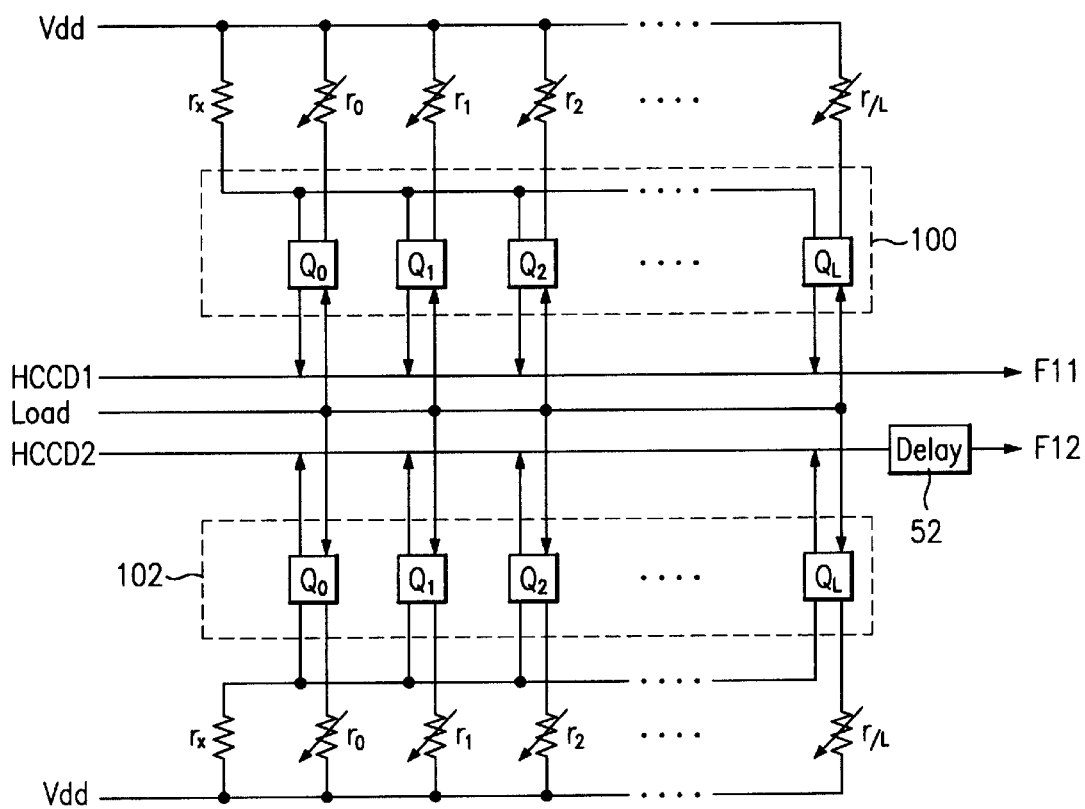
FIG. 5 illustrates the structure of the fuzzy rule memory for storing one fuzzy rule function.

FIG. 5 illustrates the structure of the fuzzy rule memory 31 for storing one fuzzy rule function. For the purposes of describing the fuzzy rule memory 31, the structure shown in FIG. 5 will be described as storing the first fuzzy rule function F1. As shown in FIG. 5, a first set 100 and a second set 102 of L+1 charge generators Q0–QL have their reference input connected to a voltage source Vdd by a reference resistor rx. Each of the L+1 charge generators Q0–QL, in each set, also have their potential input connected to the voltage source Vdd by a corresponding variable resistor r0–rL, and receive the load signal from the clock generator 35 at a load input thereof. The first set 100 of L+1 charge generators Q0–QL each have their output connected to a first horizontal CCD output line HCCD1, and the second set 102 of L+1 charge generators Q0–QL have their output connected to a second horizontal CCD output line HCCD2. The charges output by the second horizontal CCD output line HCCD2 are delayed by a delay 52.

When the fuzzy rule memory 31 is enabled by the first enable signal ien and a load signal from the clock generator 35 is received, the L+1 charge generators Q0–QL in each set store charges corresponding to the resistance value of the variable resistor, one of r0–rL, connected to their potential input. Accordingly, the resistances of variable resistors r0–rL are set such that the L+1 charge generators Q0–QL in each set store the charge values of the first fuzzy rule function F1 shown in FIG. 4$a$. In other words, the first set 100 of L+1 charge generators Q0–QL store the same charges as the second set 102 of L+1 charge generators Q0–QL, respectively, and the stored charges correspond to the fuzzy rule function values QA1–QA9 in the first fuzzy rule function F1.

The charges generated by the charge generators Q0–QL are then transferred to the first and second horizontal CCD output lines HCCD1 and HCCD2, and sequentially output to the fuzzy inference engine 33.

As discussed above, the structure shown in FIG. 5 is duplicated in the fuzzy rule memory 31 for each fuzzy rule function stored by the fuzzy rule memory 31. Although not shown, one skilled in the art will appreciate that the structures for the fuzzy rule functions include additional delays to shift the output of the fuzzy rule functions such that, for example, the fuzzy rule function values for the second fuzzy rule function F2 are output relative to the fuzzy rule function values for the first fuzzy rule function F1 as shown in FIG. 4$a$.

INPUT GENERATOR 32

Figure 6:
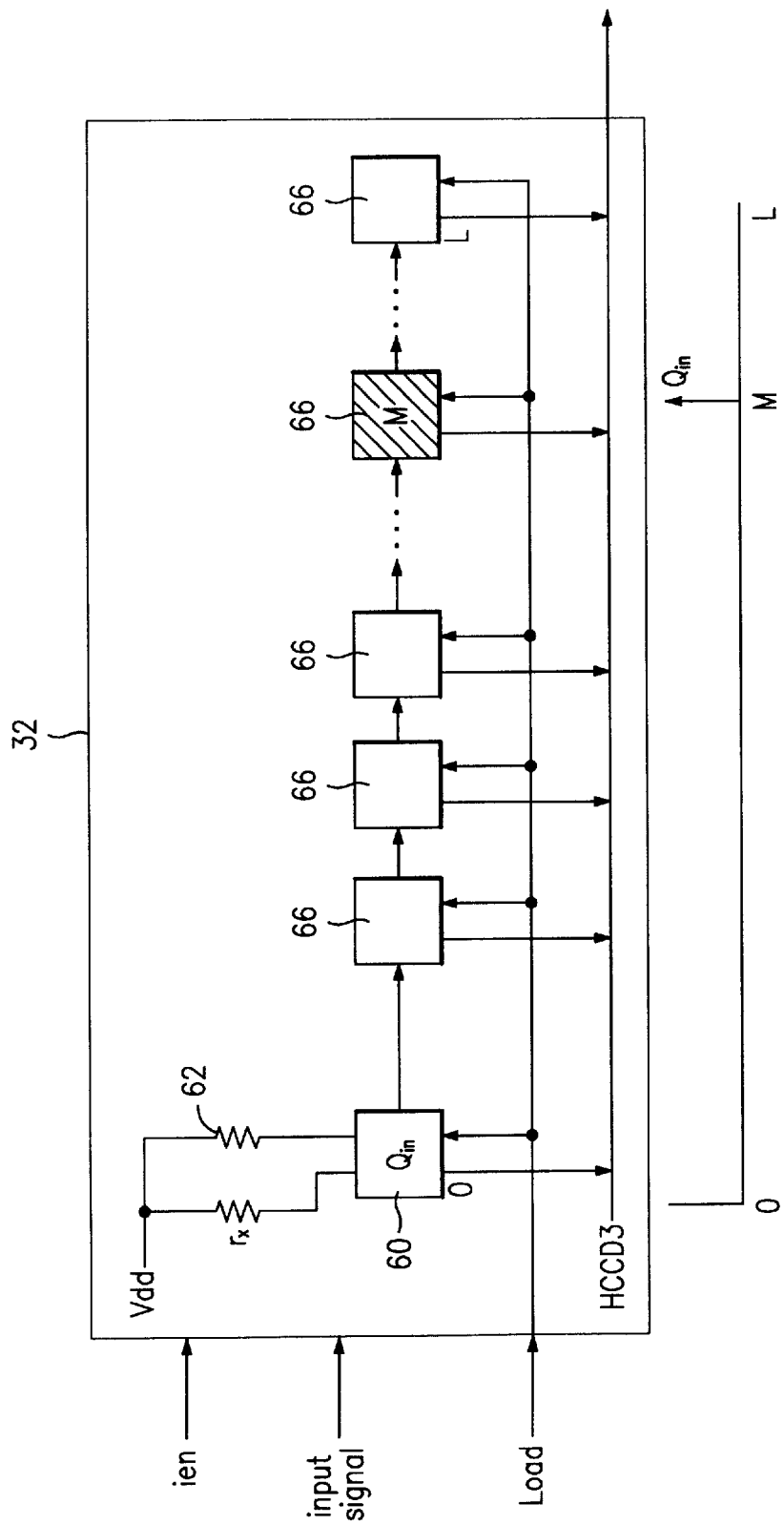
FIG. 6 is a configuration block diagram illustrating the input generator in the charge coupled device according to the present invention.

FIG. 6 is a configuration block diagram illustrating the input generator 32 in the charge coupled device 30. As shown, the input generator 32 includes a single input charge generator 60 having its reference input connected to the voltage source Vdd by a reference resistor rx. Reference resistor rx has the same resistance value as the reference resistor rx shown in FIG. 5; hence, the use of the same reference label. The potential input of the input charge generator 60 is connected to the voltage source Vdd by a resistor 62.

As further shown in FIG. 6, L charge memories 66 are connected in series to the input charge generator 60. The load inputs of the input charge generator 60 and the L charge memories 66 receive the load signal from the clock generator 35, and the outputs of the input charge generator 60 and the L charge memories 66 are connected to a third horizontal CCD line HCCD3. The L charge memories 66 plus the charge memory space provided by the input charge generator 60 equals the number, L+1, of charge generators Q0–QL provided in each set for each fuzzy rule function.

When the input generator 32 is enabled by the first enable signal ien and a load signal is received from the clock generator 35, the input charge generator 60 stores a charge Qin corresponding to the resistance of the resistor 62. The resistance of the resistor 62 is set such that the charge Qin stored in the input charge generator 60 exceeds any charge stored by the first set 100 and second set 102 of L+1 charge generators Q0–QL for each fuzzy rule function. The input charge generator 60 does not generate another charge until re-enabled.

Figure 3B:
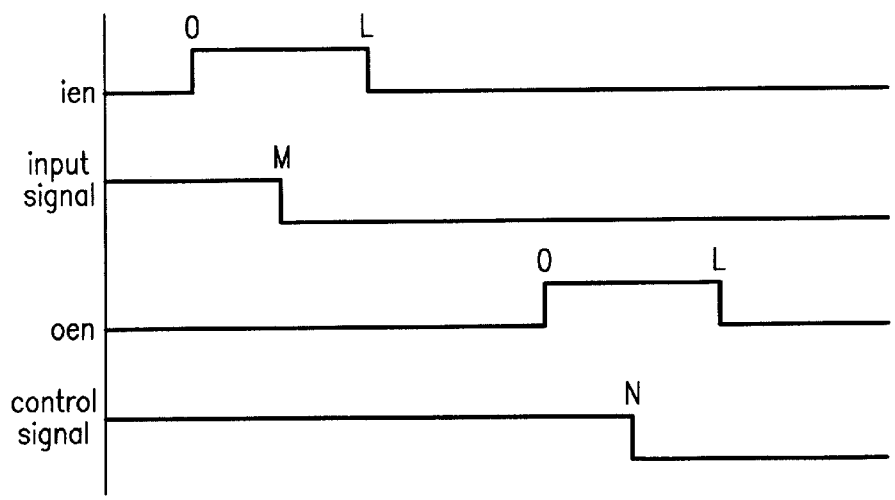

As shown in FIG. 3b, when the first enable signal ien goes high to enable both the fuzzy rule memory 31 and the input generator 32, the input signal from the sensor 36 is also high. In accordance with the operation timing supplied by the clock generator 35, the charge generated by the input charge generator 60 is shifted through the L charge memories 66 as long as both the first enable signal ien and the input signal are high. When the input signal goes low, as shown in FIG. 3b, the charge originally generated by input charge generator 60 is stored by the Mth charge memory 66. Because the input signal is low, shifting of charges through the charge memories is disabled. Accordingly, only one of the L charge memories 66 or the input charge generator 60 stores a charge, the charge Qin.

The charge values stored in the L charge memories 66 and the input charge generator 60 are then transferred to the third horizontal CCD output line HCCD3.

FUZZY INFERENCE ENGINE 33

Figure 7:
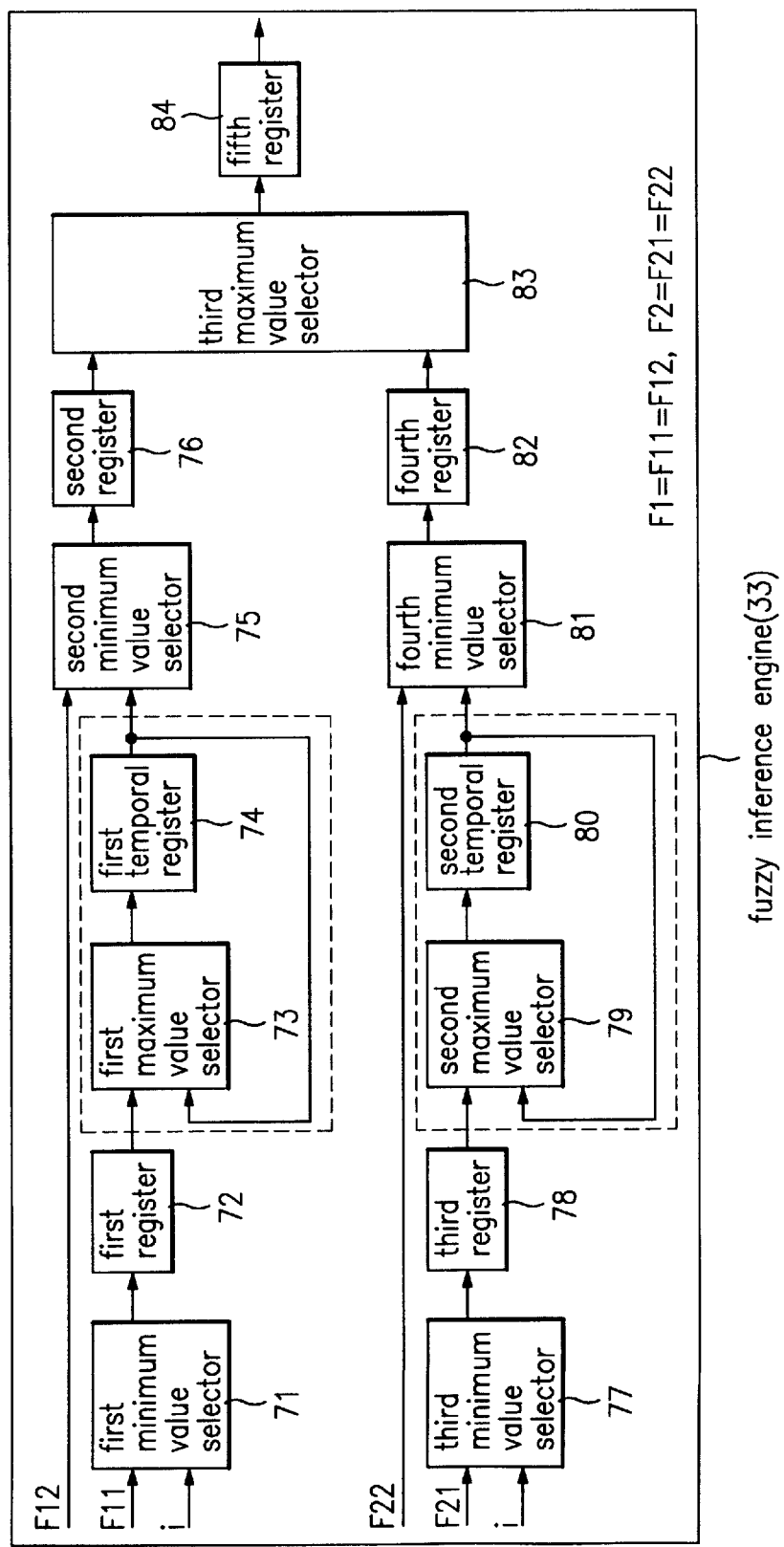
FIG. 7 is a configuration block diagram illustrating the fuzzy inference engine in the fuzzy inference circuit according to the present invention.

FIG. 7 is a configuration block diagram illustrating the fuzzy inference engine 33 in the CCD 30. As shown, a first minimum value selector 71 receives the input value i output from the input generator 32 on the third horizontal CCD line 64, and a first fuzzy rule function value F11 output by the first horizontal CCD output line HCCD1 for the first fuzzy rule function F1. The first minimum value selector 71 selects the minimum between these two inputs, and a first register 72 stores the minimum value selected. A first maximum value selector 73 receives the minimum value stored in the first register 72, and the output of the first maximum value selector 73 is stored in a first temporal register 74. The first maximum value selector 73 outputs the maximum value between the charge value stored in the first register 72 and the charge value stored in the first temporal register 74 for storage in the first temporal register 74.

A second minimum value selector 75 receives the charge value stored in the first temporal register 74 and a second fuzzy rule function value F12 output by the second horizontal CCD output line HCDD2, as delayed by the delay 52, for the first fuzzy rule function F1. The delay of the delay 52 is set equal to the time required by the first minimum value selector 71, the first register 72, the first maximum value selector 73, and the first temporal register 74 to process the 0–L charge values on the first horizontal CCD output line HCCD1 and the third horizontal CCD output line HCCD3 such that the second fuzzy rule function values F12 received by the second minimum value selector 75 are the same as the first fuzzy rule function values F11 received by the first minimum value selector 71.

A second register 76 stores the output of the second minimum value selector 75, and a third maximum value selector 83 receives the charge value stored in the second register 76.

As shown in FIG. 7, the fuzzy inference engine 33 also includes a third minimum value selector 77, a third register 78, second maximum value selector 79, second temporal register 80, fourth minimum value selector 81, and fourth register 82 which are configured and operate in the same manner as the first minimum value selector 71, the first register 72, the first maximum value selector 73, the first temporal register 74, the second minimum value selector 75, and the second register 76, respectively, except for the inputs to the third minimum value selector 77 and the fourth minimum value selector 81. Specifically, the third minimum value selector 77 receives the input value i from the input generator 32 and a third fuzzy rule function value F21 output from the first horizontal CCD output line HCCD1 for the second fuzzy rule function F2, and the fourth minimum value selector 81 receives the output of the second temporal register 80 and a fourth fuzzy rule function value F22 output from the second horizontal CCD output line HCCD2, as delayed by delay 52, for the second fuzzy rule function F2. Again, the delay 52 is such that the fourth fuzzy rule function values F22 received by the fourth minimum value selector 81 are the same as the third fuzzy rule function values F21 received the third minimum value selector 77.

The third maximum value selector 83 outputs the maximum charge value between the charge values stored in the second register 76 and the fourth register 82, and the output charge value is stored by a fifth register 84.

Figure 9:
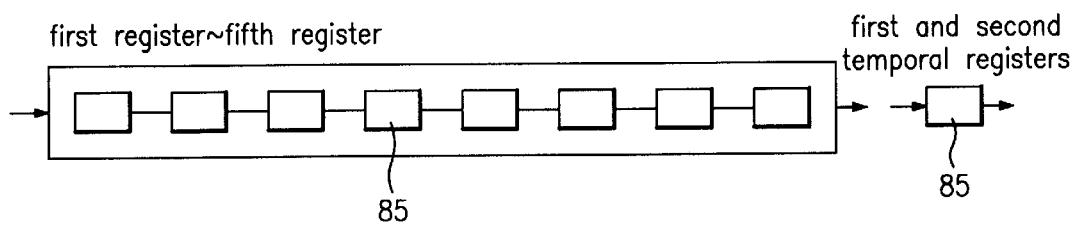
FIG. 9 is a configuration block diagram illustrating the registers in the fuzzy inference engine according to the present invention.

As shown in FIG. 9, the first, second, third, fourth, and fifth registers 72, 76, 78, 82, and 84 include L+1 charge memories 85 connected in series. As further shown in FIG. 9, the first and second temporal registers 74 and 80 include a single charge memory 85.

Figure 10:
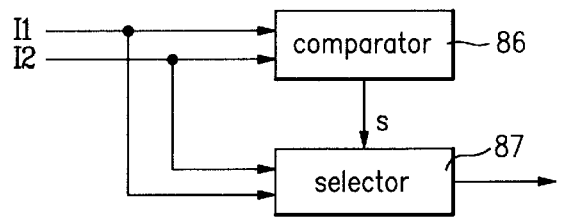
FIG. 10 is a configuration block diagram illustrating the minimum value selectors and/or the maximum value selectors of the fuzzy inference engine according to the present invention.

The first, second, third, and fourth minimum values selectors 71, 75, 77, and 81 and the first, second, and third maximum value selectors 73, 79, and 83 have the structure as shown in FIG. 10. Namely, these selectors include a comparator 86, which receives a first and second input I1 and I2, and selector 87, which also receives the first and second inputs I1 and I2. In the minimum values selectors, the comparator 86 compares the first and second inputs I1 and I2 to determine which is smaller, and outputs a selection signal S to the selector 87 such that the selector 87 outputs the smaller one of the first and second inputs I1 and I2. By contrast, in the maximum value selectors, the comparator 86 compares the first and second input signals I1 and I2 to determine which is greater. The comparator 86 then generates a selection signal such that the selector 87 outputs the greater of the first and second inputs I1 and I2.

Figure 8:
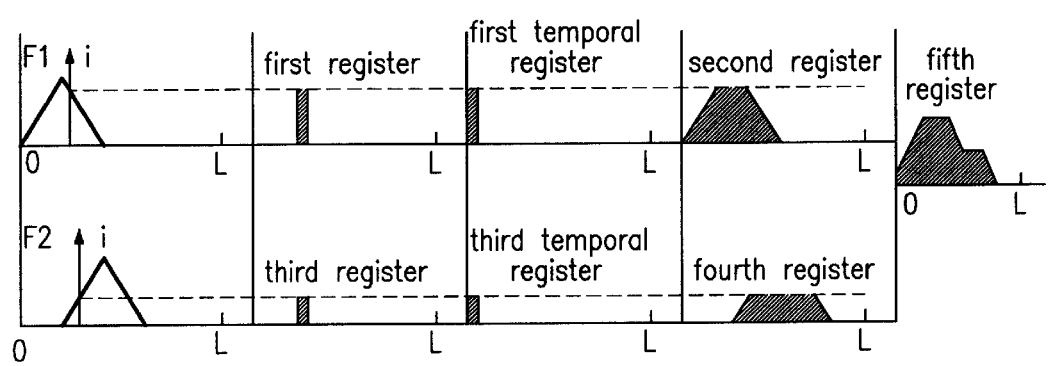
FIG. 8 shows the charges stored in the registers of the fuzzy inference engine.

FIG. 8 illustrates the charges stored in the first, second, third, fourth, and fifth registers 72, 75, 78, 82, and 84, and the first and second temporal registers 74 and 80. The left most portion of FIG. 8 illustrates the receipt of the first and second fuzzy rule functions F1 and F2 relative to the input values from the input generator 32.

As shown in FIG. 8, the first and third registers 72 and 78 do not store a charge until the non-zero input value is received from the input generator 32. Specifically, FIG. 8 shows that the first register 72 stores the minimum values between the input value i and the fuzzy rule function value F11, and the third register 78 stores the minimum values between the input value i and the third fuzzy rule function value F21. Because the input value i returns to 0, the first and second temporal registers 74 and 80 continue to store the charge value stored in the first and third registers 72 and 78, respectively.

As further shown in FIG. 8, the second register 76 stores the minimum value between the charge stored in the first temporal register 74 and the second fuzzy rule function values F12, and the fourth register 82 stores the minimum value between the charge value stored by the second temporal register 80 and the fourth fuzzy rule function values F22. The fifth register 84 then stores the maximum value between the charge values stored in the second register 76 and the fourth register 82 in accordance with the operation of the third maximum value selector 83. The output of the fifth register 84 serves as the output of the fuzzy inference engine 33.

DEFUZZY INFERENCE ENGINE 34

Figure 11:
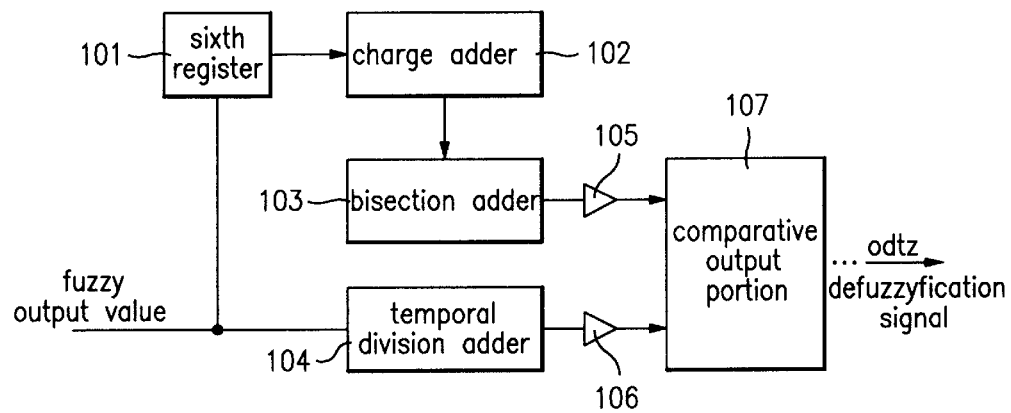
FIG. 11 is a configuration block diagram illustrating the defuzzy inference engine of the fuzzy inference circuit according to the present invention.
Figure 12:
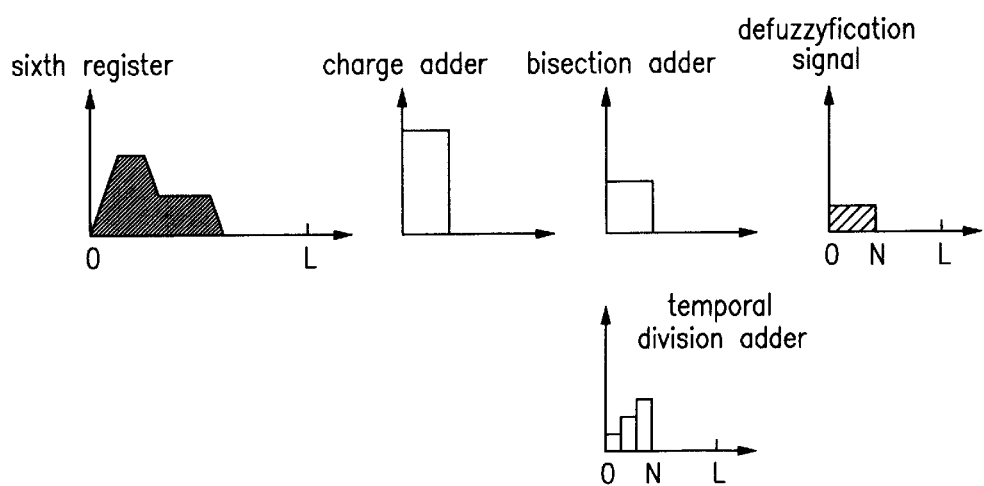
FIG. 12 shows the operation of the defuzzy inference engine of FIG. 11.

FIG. 11 is a configuration block diagram illustrating the defuzzy inference engine 34 in the CCD 30 which performs defuzzification according to the area centering method. As shown, a sixth register 101 stores the fuzzy inference values output from the fuzzy inference engine 33. Namely, the sixth register 101 stores the output of the fifth register 84; and thus, as shown in FIG. 12, the contents of the sixth register 101 are the same as the contents of the fifth register 84 as shown in FIG. 8. A charge adder 102 receives the output of the sixth register 101, and a bisection adder 103 receives the output of the charge adder 102.

A temporal division adder 104 also receives the fuzzy inference values from the fuzzy inference engine 33, and a first and second sensing amplifier 105 and 106 amplify the output of the bisection adder 103 and the temporal division adder 104, respectively. A comparative output portion 107 compares the output from the first and second sensing amplifiers 105 and 106, and generates the control signal.

As shown in FIG. 12, the charge adder 102 adds the charge values output from the sixth register 101, and the bisection adder 103 stores half of the sum produced by the charge adder 102. As further shown in FIG. 12, the temporal division adder 104 temporarily stores the resulting values by sequentially adding the charge values stored in the fifth register 84.

The first and second sensing amplifiers 105 and 106 amplify the charge values stored in the bisection adder 103 and the temporal division adder 104, respectively. The comparative output portion 107 compares the output from the bisection adder 103 with the output from the temporal division adder 104, and generates a control signal until the output from the temporal division adder 104 is greater than or equal to the output from the bisection adder 103. Accordingly, the control object 37 will operate in accordance with the control signal during the period of time that the clock generator 35 enables the control object 37.

GENERAL OPERATION

As shown in FIG. 3b, the clock generator 35 generates the first enable signal ien and the second enable signal oen at different points in time based on the processing speed of the CCD 30, and the number of fuzzy rule functions. The clock generator 35 generates the load signal when the first enable signal ien is generated. Accordingly, the fuzzy rule memory 31, input generator 32, fuzzy inference engine 33, and defuzzy inference engine 34 operate as discussed above to generate the control signal. Namely, the charge generators, charge memories, horizontal CCD output lines, etc., store and shift charges in accordance with the operation timing provided by the clock generator 35. Then, when enabled, the control object 37 operates in accordance with the control signal.

This process is then repeated.

The fuzzy inference circuit using a charge coupled device according to the present invention as aforementioned has the following advantages. First, since the fuzzy rule memory in the charge coupled device stores the fuzzy rule function value, additional memories are not required. Second, since the fuzzy inference is performed in the analog domain, it is not necessary to convert the analog sensor signal before it is input by the fuzzy inference circuit. Thus, an A/D converter and a D/A converter are not required, so that a fast fuzzy inference speed can be achieved. Finally, it is possible to control a desired fuzzy rule function value easily by changing the resistance of the variable resistor, one of r0–rL, connected to the potential input of one of the charge generators Q0–QL in the fuzzy rule memory 31.

It will be apparent to those skilled in the art that various modifications and variations can be made to the present invention without departing from the spirit or scope of the invention. Thus, it is intended that the present invention cover the modifications and variations of the invention provided they come within the scope of the appended claims and their equivalents.

What is claimed is:

1. A fuzzy inference circuit, comprising:

a sensor for sensing a state of a control object; and a charge coupled device including at least one plurality of charge generators for generating and storing at least one fuzzy rule function, and performing a fuzzy inference on output of said sensor using said stored fuzzy rule function to generate a control signal for controlling said control object.

2. The fuzzy inference circuit of claim 1, wherein said charge coupled device comprises:

a fuzzy rule memory including said plurality of charge generators, said plurality of charge generators for storing fuzzy rule function values of said fuzzy rule function as charges.

3. The fuzzy inference circuit of claim 1, wherein said charge coupled device comprises:

a fuzzy rule memory including said plurality of charge generators, said plurality of charge generators for storing fuzzy rule function values of said fuzzy rule function;

an input generator for generating input values based on said output of said sensor;

a fuzzy inference engine for performing said fuzzy inference on said input values using said fuzzy rule function values; and a defuzzy inference engine for defuzzifying output of said fuzzy inference engine to generate said control signal.

4. The fuzzy inference circuit of claim 3, wherein said fuzzy rule memory further comprises:

a pair of resistors connected between each charge generator and a voltage source; and wherein each charge generator generates a charge based on resistance values for said pair of resistors connected thereto.

5. The fuzzy inference circuit of claim 3, wherein said input generator comprises:

an input charge generator for generating a charge; and a number of charge memories connected in series to said charge generator.

6. The fuzzy inference circuit of claim 5, wherein said input generator shifts said charge generated by said input charge generator through said charge memories based on said output from said sensor.

7. The fuzzy inference circuit of claim 3, wherein said fuzzy rule memory includes a first and second set of charge generators corresponding to each fuzzy rule function, each of said first and second set of charge generators including a first number of charge generators; and said input generator includes, an input charge generator for generating a charge, and a second number of charge memories connected in series to said input charge generator, and said second number plus one is equal to said first number.

8. The fuzzy inference circuit of claim 3, wherein said fuzzy inference engine comprises:

a first minimum value selector for selecting a minimum one of said input values and fuzzy rule function values for a first fuzzy rule function output from said fuzzy rule memory;

a first maximum value selector for selecting a maximum one of output from said first minimum value selector and a first stored value;

a first temporal register for storing output of said first maximum value selector as said first stored value;

a second minimum value selector for selecting a minimum one of said first stored value and said fuzzy rule function values for said first fuzzy rule function;

a third minimum value selector for selecting a minimum one of said input values and fuzzy rule function values for a second fuzzy rule function output from said fuzzy rule memory;

a second maximum value selector for selecting a maximum one of output from said third minimum value selector and a second stored value;

a second temporal register for storing output of said second maximum value selector as said second stored value;

a fourth minimum value selector for selecting a minimum one of said second stored value and said fuzzy rule function values for said second fuzzy rule function; and a third maximum value selector for selecting a maximum one of output from said second minimum value selector and output from said fourth minimum value selector.

9. The fuzzy inference circuit of claim 8, wherein said fuzzy inference engine further comprises:

a first register for storing said output from said first minimum value selector;

a second register for storing said output from said second minimum value selector;

a third register for storing said output from said third minimum value selector;

a fourth register for storing said output from said fourth minimum value selector; and a fifth register for storing output from said third maximum value selector.

10. The fuzzy inference circuit of claim 9, wherein said first, second, third, fourth and fifth registers each include a first number of memory cells connected in series; and said first and second temporal registers each include a single memory cell.

11. The fuzzy inference circuit of claim 10, wherein said fuzzy rule memory includes a first and second set of charge generators corresponding to each fuzzy rule function, each of said first and second set of charge generators including a second number of charge generators, and said second number is equal to said first number.

12. The fuzzy inference circuit of claim 3, wherein said defuzzy inference engine comprises:

an adder for generating a sum of said output from said fuzzy inference engine;

a bisection adder for dividing said sum in half;

a temporal division adder for sequentially adding said output from said fuzzy inference engine; and a comparator output unit for generating said control signal until output from said temporal division adder is greater than or equal to output from said bisection adder.

13. The fuzzy inference circuit of claim 1, wherein charge generators in said plurality of charge generators generate charges corresponding to fuzzy rule function values in said fuzzy rule function.

14. A fuzzy inference circuit, comprising:

a sensor for sensing a state of a control object;

a fuzzy rule memory including a plurality of charge generators in a charge coupled device, said charge generators for generating and storing fuzzy rule function values for at least one fuzzy rule function;

a fuzzy inference engine using said charge coupled device for performing a fuzzy inference on output of said sensor based on said fuzzy rule function values; and a defuzzy inference engine for generating a control signal to control said control object based on output of said fuzzy inference engine.

15. The fuzzy inference circuit of claim 14, further comprising:

an input generator for generating input values based on output of said sensor using said charge coupled device.

16. A fuzzy inference method, comprising:

sensing a state of a control object using a sensor;

generating and storing fuzzy rule function values for at least one fuzzy rule function using a plurality of charge generators in a charge coupled device;

performing, using said charge coupled device, a fuzzy inference on output of said sensor based on said fuzzy rule function values; and controlling said control object based on output of said performing step.

17. The fuzzy inference method of claim 16, wherein said storing step stores said fuzzy rule function values as charges using said plurality of charge generators.

18. The fuzzy inference method of claim 16, further comprising:

generating input values based on said output of said sensor using said charge coupled device; and defuzzifying output of said performing step to generate said control signal for controlling said control object.

19. The fuzzy inference method of claim 18, wherein said performing step comprises:

first minimum value selecting a minimum one of said input values and fuzzy rule function values for a first fuzzy rule function output from said storing step;

first maximum value selecting a maximum one of output from said first minimum value selecting step and a first stored value;

first temporally storing output of said first maximum value selecting step as said first stored value;

second minimum value selecting a minimum one of said first stored value and said fuzzy rule function values for said first fuzzy rule function;

third minimum value selecting a minimum one of said input values and fuzzy rule function values for a second fuzzy rule function output from said storing step;

second maximum value selecting a maximum one of output from said third minimum value selecting step and a second stored value;

second temporally storing output of said second maximum value selecting step as said second stored value;

fourth minimum value selecting a minimum one of said second stored value and said fuzzy rule function values for said second fuzzy rule function; and third maximum value selecting a maximum one of output from said second minimum value selecting step and output from said fourth minimum value selecting step.

20. The fuzzy inference method of claim 18, wherein said defuzzifying step comprises:

generating a sum of said output from said performing step over a first period of time;

dividing said sum in half;

sequentially adding said output from said performing step; and generating said control signal until output from said sequentially adding step is greater than or equal to output from said dividing step.

* * * * *